No. 772,637. PATENTED OCT. 18, 1904.
T. P. THERIAULT.
POTATO DIGGER AND PICKER.
APPLICATION FILED AUG. 27, 1901.
NO MODEL.
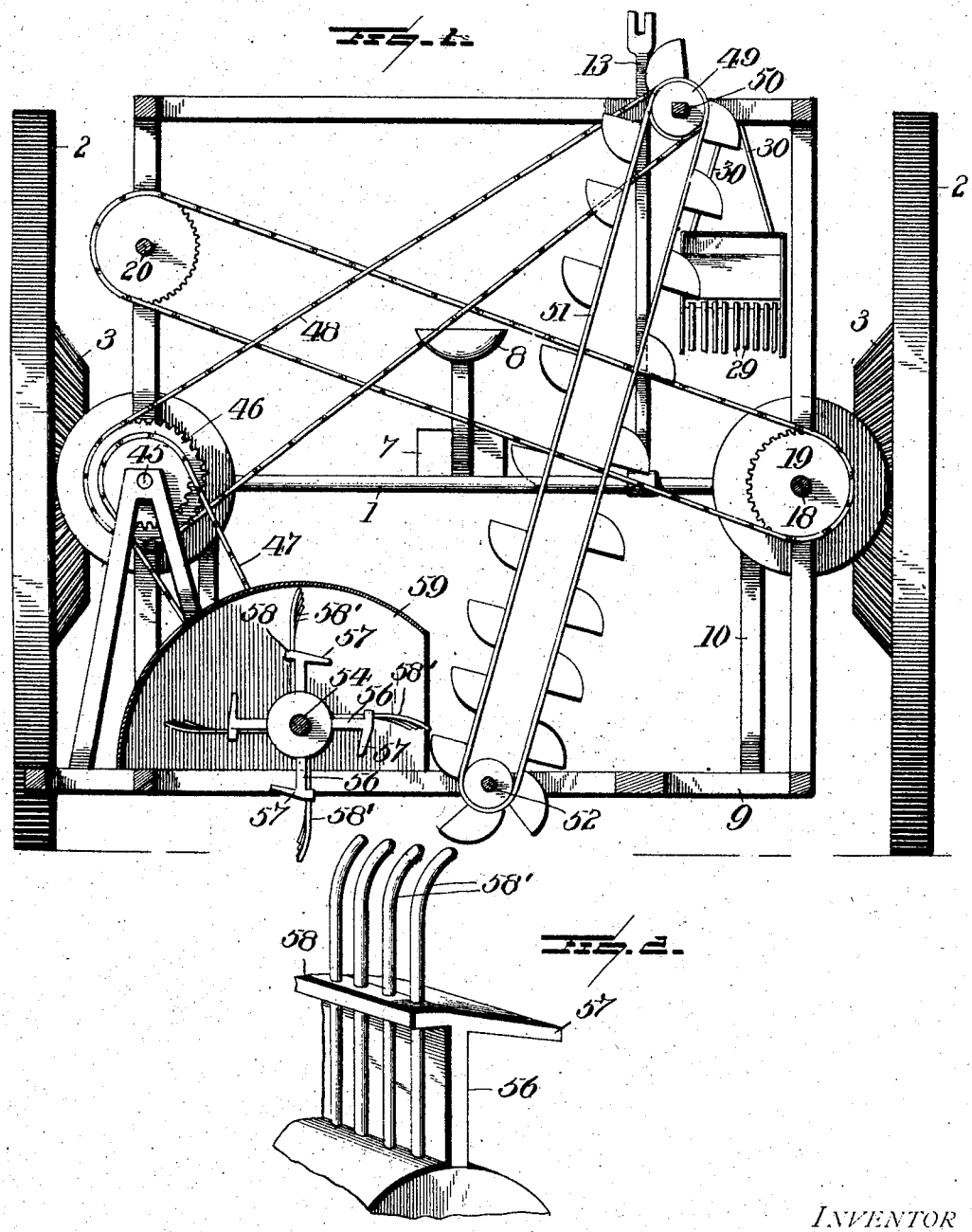
WITNESSES:
INVENTOR No. 772,637. Patented October 18, 1904.

UNITED STATES PATENT OFFICE.

THOMAS P. THERIAULT, OF ST. FRANCIS, CANADA, ASSIGNOR TO VINCENT M. THERIAULT, OF FORT KENT, MAINE.

POTATO DIGGER AND PICKER.

SPECIFICATION forming part of Letters Patent No. 772,637, dated October 18, 1904.

Application filed August 27, 1901. Serial No. 73,474. (No model.)

*To all whom it may concern:*

Be it known that I, THOMAS P. THERIAULT, a citizen of Canada, residing at St. Francis, New Brunswick, Canada, have invented certain new and useful Improvements in Potato Diggers and Pickers, of which the following is a specification, reference being had therein to the accompanying drawings.

This invention relates to harrows and diggers, and has for its object to provide a novel potato-digger suitably rotatable.

With the foregoing and other objects in view the invention consists in the details of construction and in the arrangement and combination of parts to be hereinafter more fully set forth and specifically claimed.

In describing the invention in detail reference will be had to the accompanying drawings, forming part of this specification, wherein in like characters denote corresponding parts throughout both views, in which—

Figure 1 illustrates a fragment of a frame and power-transmitting mechanism with the digger shown in elevation. Fig. 2 is a perspective view of a portion of the digger.

In the drawings, 1 denotes a shaft, and 2 ground-wheels carrying gear-wheels 3, by which motion is transmitted to the shafts 18 and 45, respectively, and to the gearing 19, 20, 46, and 49, which are suitably connected by chains. The chain 48 extends from the gear-wheel 46 to a gear-wheel on the shaft 50. A suitable shaker 29 is suspended by the hangers 30, and the frame-sections 9 and 10 are provided for supporting the parts. A wheel 49 moves the conveyer 51, which runs over a wheel on the shaft 52. A seat 8 is suitably anchored to the platform 7, which is carried by the frame in any suitable manner. The foregoing elements form no part of the present invention, but are shown and described in operative relation to a digger.

The digger comprises in its construction a shaft 54, which is mounted in any suitable bearings and is provided with radiating arms 56, each of which is provided with a rib or flange 57, formed with a rib and pocket or shelf for carrying the potatoes as they are scooped from the ground. Extensions 58 are formed on the arms and are oppositely disposed with relation to the ribs 57. Prongs 58' are run through the extensions and have their ends embedded in the shaft. The outer ends of the prongs terminate on different horizontal planes, and those at one end have a greater curvature than those at the opposite end, and as the fingers are rotated they contact with the ground successively and not simultaneously. Hence the power required is minimized.

The shield 59 is provided for the excavating-wheel to prevent the dirt and potatoes from discharging from the ribs or prongs, as the centrifugal force might have a tendency to effect if this shield is not applied.

Having thus fully described the invention, what I claim as new, and desire to secure by Letters Patent, is—

In a potato-digger, an excavating-wheel comprising arms attached to a shaft, flanges on the arms, and prongs of different curvatures secured to the shaft and flanges adapted to enter the ground consecutively.

In testimony whereof I affix my signature in the presence of two witnesses.

THOMAS P. THERIAULT.

Witnesses:
A. G. FENLASON,
HOWARD PIERCE.